United States Patent
Unrath

(10) Patent No.: US 10,160,470 B2
(45) Date of Patent: Dec. 25, 2018

(54) MARKET TROLLEY

(71) Applicant: Nancy K. N. Unrath, Portland, OR (US)

(72) Inventor: Nancy K. N. Unrath, Portland, OR (US)

( * ) Notice: Subject to any disclaimer, the term of this patent is extended or adjusted under 35 U.S.C. 154(b) by 0 days.

(21) Appl. No.: 15/000,401

(22) Filed: Jan. 19, 2016

(65) Prior Publication Data

US 2016/0207556 A1    Jul. 21, 2016

Related U.S. Application Data

(60) Provisional application No. 62/105,508, filed on Jan. 20, 2015.

(51) Int. Cl.
| | | |
|---|---|---|
| *B62B 3/00* | (2006.01) | |
| *B62B 3/02* | (2006.01) | |
| *B62B 5/00* | (2006.01) | |
| *B62B 5/06* | (2006.01) | |

(52) U.S. Cl.
CPC ............ *B62B 3/027* (2013.01); *B62B 5/0013* (2013.01); *B62B 5/065* (2013.01); *B62B 5/067* (2013.01); *B62B 2202/12* (2013.01); *B62B 2206/06* (2013.01)

(58) Field of Classification Search
CPC .... B65D 21/04; B65D 21/048; B65D 21/043; B65D 21/0226; B62B 3/027; B62B 2202/12; B62B 5/0013
See application file for complete search history.

(56) References Cited

U.S. PATENT DOCUMENTS

| | | | | |
|---|---|---|---|---|
| 2,819,938 A | * | 1/1958 | Zerver ................... | A47B 31/00 206/216 |
| 3,376,046 A | * | 4/1968 | Kivett ...................... | B62B 1/10 206/506 |
| 3,782,752 A | | 1/1974 | Gobetz | |
| 3,913,935 A | * | 10/1975 | McGillicuddy ......... | B62B 3/027 280/641 |
| 4,161,252 A | * | 7/1979 | Howells ............. | B65D 21/0217 206/508 |

(Continued)

FOREIGN PATENT DOCUMENTS

| | | |
|---|---|---|
| EP | 2578468 A1 | 4/2013 |
| JP | 77078 U | 5/1987 |

(Continued)

OTHER PUBLICATIONS

International preliminary report on patentability from PCTUS2016013937, dated Jul. 25, 2017, The International Bureau of WIPO.

*Primary Examiner* — James M Dolak
(74) *Attorney, Agent, or Firm* — patenttm.us

(57) ABSTRACT

A personal shopping cart, or trolley, to be used to transport purchased items, includes a wheeled base, a handle that extends and retracts, and multiple nesting bins or containers. The wheels and handle are such that the trolley can be easily pulled or pushed. The bins are attached to a frame allowing different vertical positions, enabling the bins to either nest into each other (for storage, minimizing its size), or to extend vertically for carrying merchandise. All bins, with the exception of the bottom bin, are removable from the frame.

23 Claims, 21 Drawing Sheets

(56) References Cited

U.S. PATENT DOCUMENTS

| | | | |
|---|---|---|---|
| 4,248,442 A * | 2/1981 | Barrett | B62B 3/02 206/505 |
| 4,249,749 A * | 2/1981 | Collier | B62B 1/00 108/145 |
| 4,596,397 A | 6/1986 | Conti | |
| 4,989,889 A | 2/1991 | Server Perez | |
| 5,192,092 A * | 3/1993 | DiBenedetto | B62B 1/12 150/154 |
| 5,445,397 A * | 8/1995 | Evans | B62B 1/10 206/505 |
| 5,464,104 A * | 11/1995 | McArthur | A47F 5/0025 211/133.3 |
| 5,595,395 A * | 1/1997 | Wilson | B62B 1/14 280/47.19 |
| 5,678,842 A | 10/1997 | Hook et al. | |
| D396,923 S * | 8/1998 | Moore | 280/47.26 |
| 5,927,745 A | 7/1999 | Cunningham | |
| 6,032,965 A * | 3/2000 | Sabounjian | A47B 47/06 280/47.35 |
| 6,131,926 A * | 10/2000 | Harlan | B62B 1/14 280/47.26 |
| 6,267,393 B1 | 7/2001 | Mengrone et al. | |
| 6,378,891 B1 | 4/2002 | Maher et al. | |
| 6,394,471 B1 * | 5/2002 | Watson | B62B 3/184 280/33.996 |
| 6,425,599 B1 | 7/2002 | Tsai | |
| 6,616,174 B2 | 9/2003 | Bierma | |
| 6,626,446 B1 | 9/2003 | Yosef | |
| 6,708,991 B1 * | 3/2004 | Ortlieb | A61M 5/1415 248/122.1 |
| 6,889,998 B2 | 5/2005 | Sterns et al. | |
| 6,932,363 B2 * | 8/2005 | D'Angelo | A45B 11/00 211/126.6 |
| 7,063,339 B2 * | 6/2006 | Jarko | B62B 1/14 280/47.19 |
| 7,147,243 B2 * | 12/2006 | Kady | A01K 97/06 280/47.26 |
| 7,168,715 B1 | 1/2007 | Friedman | |
| 7,188,847 B1 | 3/2007 | Friedman | |
| 7,213,817 B2 | 5/2007 | Cheung | |
| 7,246,814 B2 | 7/2007 | Prather et al. | |
| 7,392,992 B2 * | 7/2008 | Stone | B62B 1/125 224/411 |
| 7,458,600 B1 | 12/2008 | Berke et al. | |
| 7,500,681 B2 | 3/2009 | Steadman | |
| 7,503,569 B2 * | 3/2009 | Duvigneau | A45C 7/0045 190/110 |
| 7,566,069 B1 * | 7/2009 | Ortega | B62B 3/027 280/32.6 |
| 7,614,628 B2 * | 11/2009 | O'Connor | A45C 5/143 280/37 |
| 7,703,776 B1 * | 4/2010 | Nugent | B62B 1/22 280/47.18 |
| 8,066,291 B2 | 11/2011 | Cagan et al. | |
| 8,172,239 B1 | 5/2012 | Boyd et al. | |
| 8,297,629 B2 | 10/2012 | Gimeno Verdejo et al. | |
| 8,333,404 B2 | 12/2012 | Moster | |
| 8,523,219 B2 | 9/2013 | Freeman et al. | |
| 8,528,931 B2 | 9/2013 | Loureiro Benimeli | |
| 8,550,474 B2 | 10/2013 | Geva et al. | |
| 8,567,809 B2 | 10/2013 | White et al. | |
| 8,702,111 B2 | 4/2014 | Simoes | |
| 8,695,995 B2 | 5/2014 | Musi | |
| 8,714,569 B2 | 5/2014 | Lu et al. | |
| 8,720,656 B2 | 5/2014 | Ready | |
| 8,733,786 B1 | 5/2014 | James | |
| 8,739,986 B2 | 6/2014 | Preidt et al. | |
| 8,814,181 B1 | 8/2014 | Weldon et al. | |
| 8,814,199 B2 | 8/2014 | Shindelar et al. | |
| 8,827,303 B1 | 9/2014 | Fridman | |
| 8,827,304 B2 | 9/2014 | Shalaby et al. | |
| 8,844,949 B2 * | 9/2014 | White | B62B 5/067 280/38 |
| 8,851,504 B1 | 10/2014 | Goldszer | |
| 8,864,149 B2 * | 10/2014 | Stryker | A61G 12/001 280/47.35 |
| 9,050,988 B1 * | 6/2015 | McLeod | B62B 3/022 |
| D757,387 S * | 5/2016 | Cao | D34/21 |
| 9,573,611 B2 * | 2/2017 | Coyle | B62B 3/027 |
| 9,643,629 B2 * | 5/2017 | Bar-Erez | A47B 81/00 |
| 9,714,045 B2 * | 7/2017 | Dhand | B62B 5/06 |
| 9,731,741 B1 * | 8/2017 | Lucas | B62B 3/027 |
| 9,796,402 B1 * | 10/2017 | Suarez | B62B 5/0053 |
| 9,914,468 B2 * | 3/2018 | Coules | B62B 3/027 |
| 9,963,161 B2 * | 5/2018 | Sainato | B62B 3/10 |
| 2004/0113381 A1 * | 6/2004 | Bergia | B62B 3/02 280/47.26 |
| 2005/0006877 A1 | 1/2005 | Kachkovsky | |
| 2007/0096437 A1 * | 5/2007 | Watson | B62B 3/027 280/651 |
| 2011/0115178 A1 * | 5/2011 | De Sousa | B62B 3/1468 280/47.35 |
| 2012/0074664 A1 | 3/2012 | Henny et al. | |
| 2012/0160886 A1 | 6/2012 | Henny et al. | |

FOREIGN PATENT DOCUMENTS

| | | |
|---|---|---|
| JP | 56734 U | 4/1989 |
| JP | 56735 U | 4/1989 |

* cited by examiner

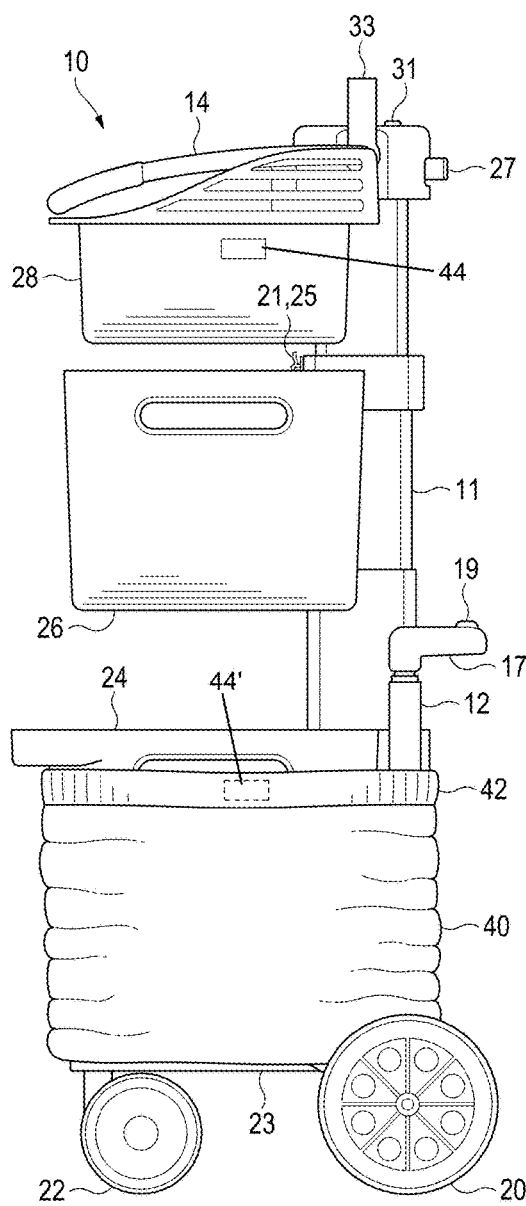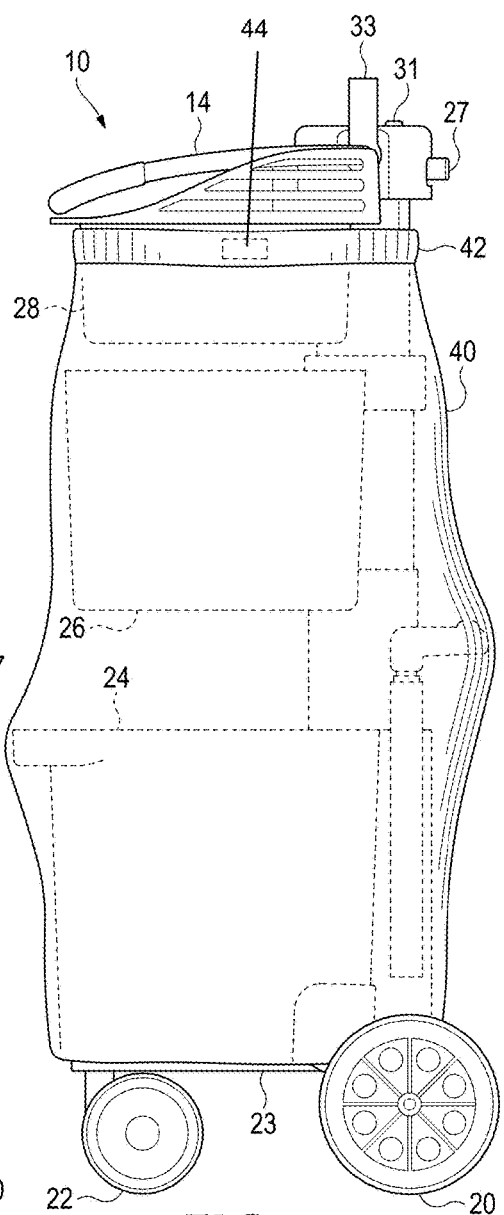

MARKET TROLLEY

CROSS-REFERENCE TO RELATED APPLICATIONS

This application claims benefit of U.S. provisional patent application SN62/105,508 filed Jan. 20, 2015.

BACKGROUND

This disclosure relates to personal shopping carts, and more particularly to an improved market trolley.

Personal shopping carts, rolling trolley bags, and wheeled baskets have become popular for transporting merchandise, especially in urban areas. They are particularly helpful for grocery shopping and farmer's market shopping, eliminating the cumbersome chore of carrying multiple bags.

However, most trolley carts have a single compartment. When groceries are loaded and transported, fragile merchandise (produce, bread, eggs, chips) become bruised, damaged, crushed, and broken due to the weight of the other groceries. In addition, if a shopper were to drive home after shopping, for instance from a farmer's market, he or she would need to unload at least part of a loaded trolley cart in order to comfortably stow the trolley cart back into the car.

A few trolley cart designs have two compartments, however, the frames are large or heavy and are not easily loaded into a car. They are also designed with oversized, utilitarian bins unsuitable and unattractive for shopping in neighborhood boutiques, clothing stores, and shopping malls.

Furthermore, most trolley carts are not designed to be pushed, making heavily loaded trolley carts tiring to pull.

SUMMARY

In accordance with the disclosure, a market trolley has multiple nesting bins and is collapsible to allow easy storage and transport when empty.

Accordingly, it is an advantage of the present disclosure to provide an improved market trolley.

It is a further advantage of the present disclosure to provide an improved market trolley that has nesting bins.

It is yet another advantage of the present disclosure to provide an improved market trolley with nesting bins that can be collapsed.

A further advantage is to provide a market trolley can easily be pulled or pushed.

Another advantage is to provide an attractive and practical cover lid and side cover that are integral to the design but easily removed if desired.

The subject matter of the present technology is particularly pointed out and distinctly claimed in the concluding portion of this specification. However, both the organization and method of operation, together with further advantages and embodiments thereof, may best be understood by reference to the following description taken in connection with accompanying, drawings wherein like reference characters refer to like elements.

BRIEF DESCRIPTION OF THE DRAWINGS

FIG. 8 is a side view of a market trolley illustrating an optional side cover, with the cover in a retracted position;

FIG. 9 is a side view of the market trolley illustrating an optional side cover, with the cover in a fully extended position;

DETAILED DESCRIPTION

The system according to a preferred embodiment of the present disclosure comprises a market trolley adapted to be used by an individual shopper enabling the shopper to transport merchandise and purchases without the burden of carrying them.

The trolley comprises multiple bins attached to a frame integrated into or mounted to a bottom base bin with wheels and a retractable handle. The upper bins are attached to the frame and the frame retracts or collapses enabling the topmost bin to nest into the middle bin (s) which then nest into the bottommost bin.

The trolley provides a number of advantages:

The trolley can be used for a variety of shopping: farmer's market shopping, grocery shopping, shopping at a mall or in city boutiques.

The trolley can be used to carry personal items: purses, gym clothes, laptops, etc.

The multiple bins prevent crushing, bruising, and breaking merchandise especially in the case of fragile items such as produce, eggs, bread, chips, etc.

The trolley can be used while shopping, eliminating the need to store or carry it as with a conventional market trolley. Furthermore, using the trolley while shopping ensures that all merchandise will fit back in the trolley after purchasing.

The trolley eliminates bringing one's own bags, using dirty store carts, and using disposable wipes to clean store cart handles used by the public.

The trolley encourages "green" living:

a. walking and transporting groceries or merchandise is easier b. shopping bags are unnecessary with the reusable bins c. wasting and tossing of bruised and damaged food is eliminated
d. one trolley can be used for multiple purposes, eliminating different bags and cases for work, shopping, exercising, etc.

The nesting bin design enables the user to transport the trolley in its most compact size to eliminate unnecessary bulk, while keeping bins at hand when needed.

The nesting bins and extendable handle make the trolley easy to store or put into a car.

The removable bin design allows easy loading into a car after shopping. Unlike the single basket or bag market trolleys, the removable bins can be stowed separately, and merchandise does not need to be transferred in order to get a heavier, fully loaded trolley into the car then later into the home.

Heavier merchandise is more easily carried in a rigid bin rather than in a bag.

Most market trolleys are designed to be pulled. The present design allows an individual the option to push the trolley makes handling easier with a heavier load.

The push option and removable bin design eases strain on an individual's shoulders, hands, and back. This is especially helpful for those vulnerable to injury and for senior citizens.

Figure 1:
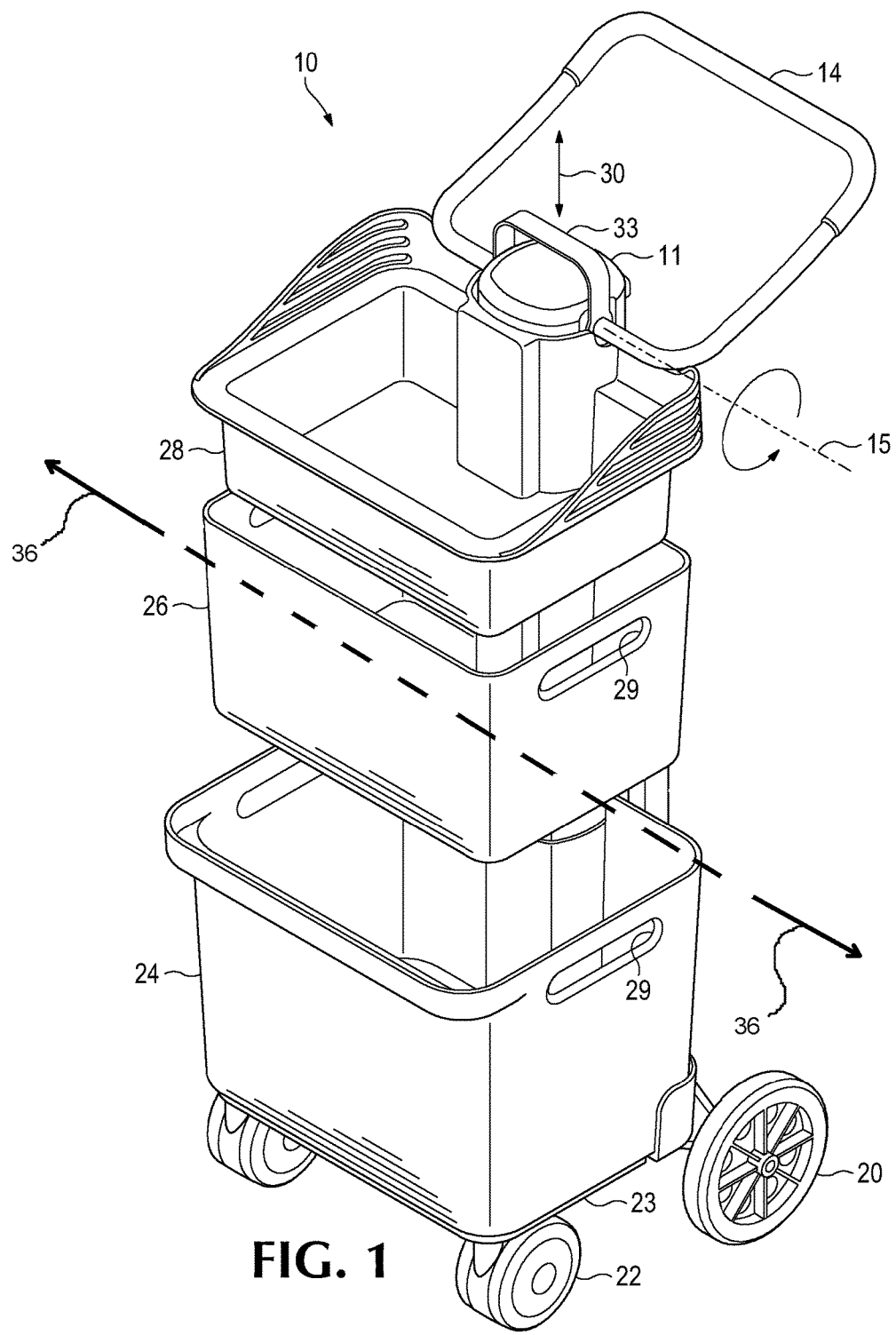
FIG. 1 is a perspective view of a market trolley in accordance with the disclosure.

Referring now to FIG. 1, a perspective view of a market trolley 10 having nesting bins (3 such bins being shown in the illustrated embodiment), an extensible support frame (bin rack) 11 is provided together with a first extensible handle 12 (visible in FIG. 2) and a pivoting handle 14 that pivots forwardly or rearwardly from the frame, attached to the support frame by a pivotal mounting mechanism, enabling pivotal movement handle 14 around axis 15. Handle 12 can be extended upwardly to the configuration of FIG. 2 to allow for pulling or pushing the trolley much in the manner of a suitcase, for longer distance travel to and from a market for example. The handle 12 moves upwardly and downwardly in the directions of vertical axis 30 of FIG. 2 for reducing the size of the trolley for storage. In an alternative embodiment, handle 12 could be mounted on the sides of the bottom bin 24 and collapse or extend with telescoping and pivoting movements.

At the lower end of the trolley are sets of wheels, rear wheels 20 mounted at the left and right edges of the rear of the trolley one such wheel 20 visible in the figure), front wheels 22 mounted at the left and right edges of the front of the trolley, which enable the trolley to be moved by pulling or pushing, by the user grasping the handle 12 and or pivoting extension 14. In an alternative embodiment, handle 12 need not be included, and the handle 14 can be used to move the trolley much in the manner of pushing or pulling a shopping cart. Suitably the wheels are mounted to a lower frame bracket 23 supporting bottom bin 24, although they may alternatively be mounted to the bottom bin 24 without use of bracket 23. Front wheels 22 are swivel mounted to allow the directional orientation of the wheel axis to change with movement, or fixed mounted to orient the wheels parallel the front to rear axis of the trolley. In another configuration, the rear wheels 20 are swivel mounted to allow directional orientation as with a spinner type of suitcase. One or more of the front or rear wheels may be provided with a locking function, to keep the trolley from unintentionally rolling or to prevent the wheels from swiveling. Alternately, a brake system may be incorporated into the bottom bin, bin rack frame or handle assembly.

Figure 2:
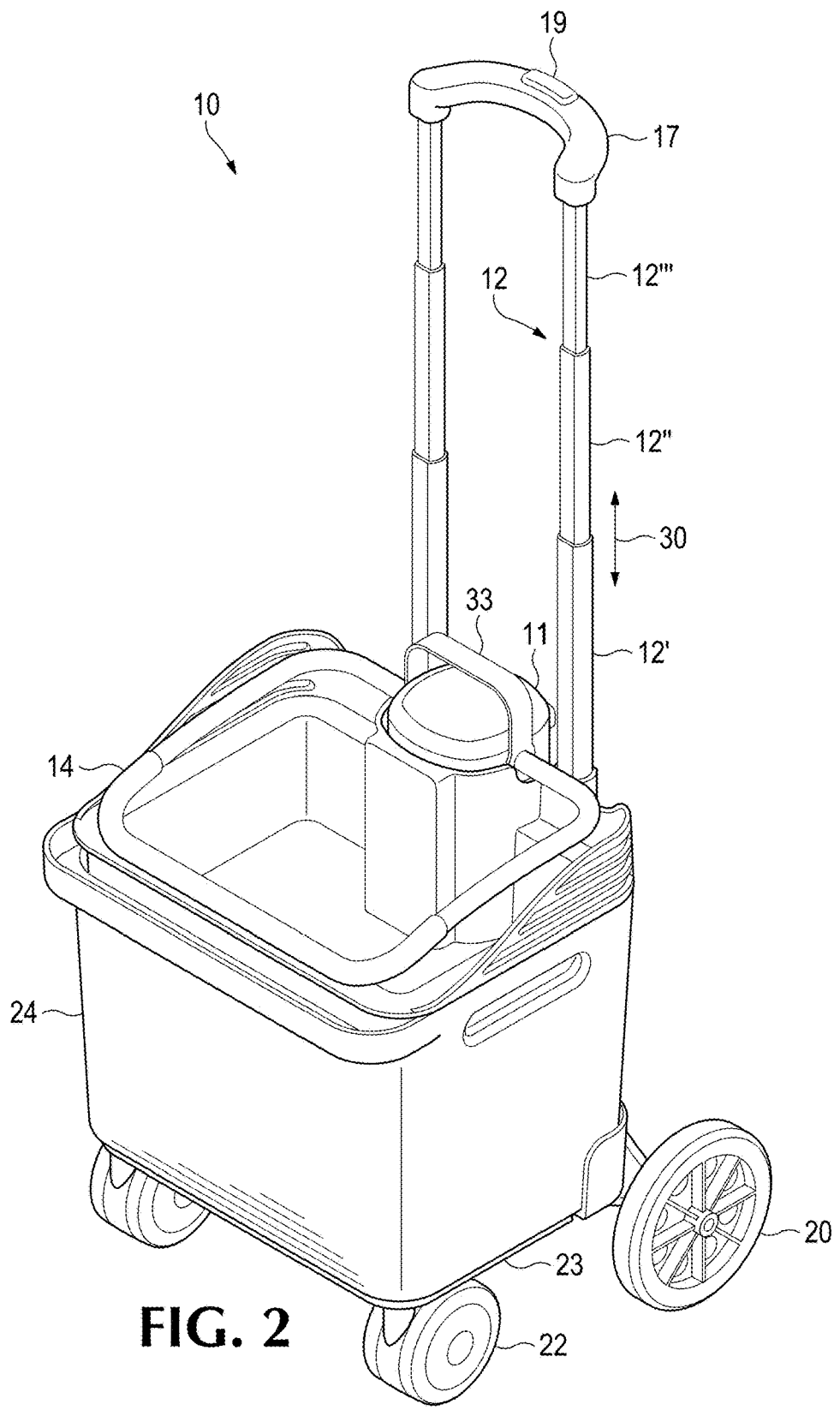
FIG. 2 is a view of the market trolley of FIG. 1 with the bins nested together and the handle extended.
Figure 3:
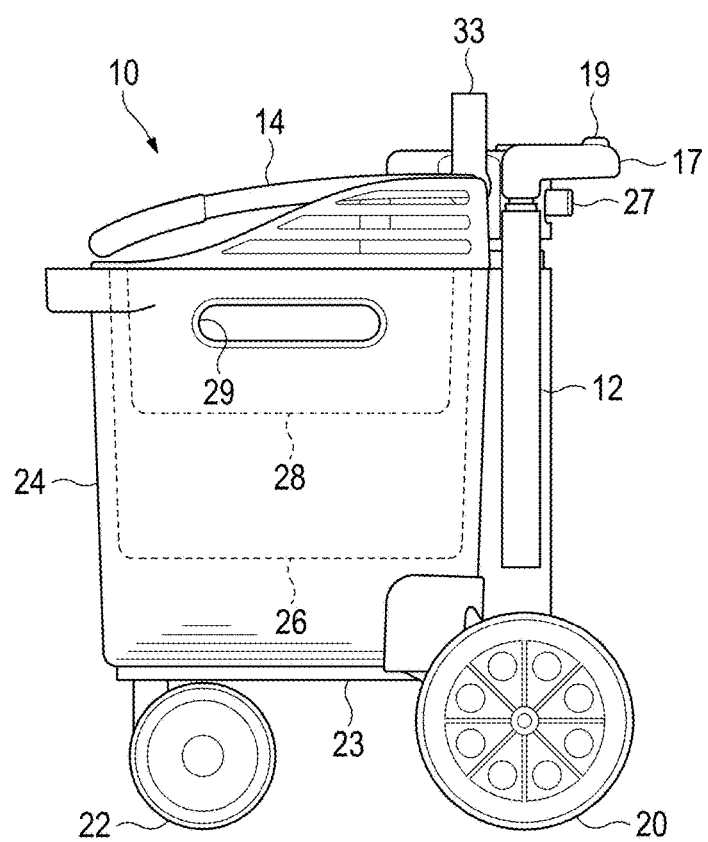
FIG. 3 is a side view of the market trolley of FIG. 1 with the bins nested together and the handle collapsed.
Figure 4:
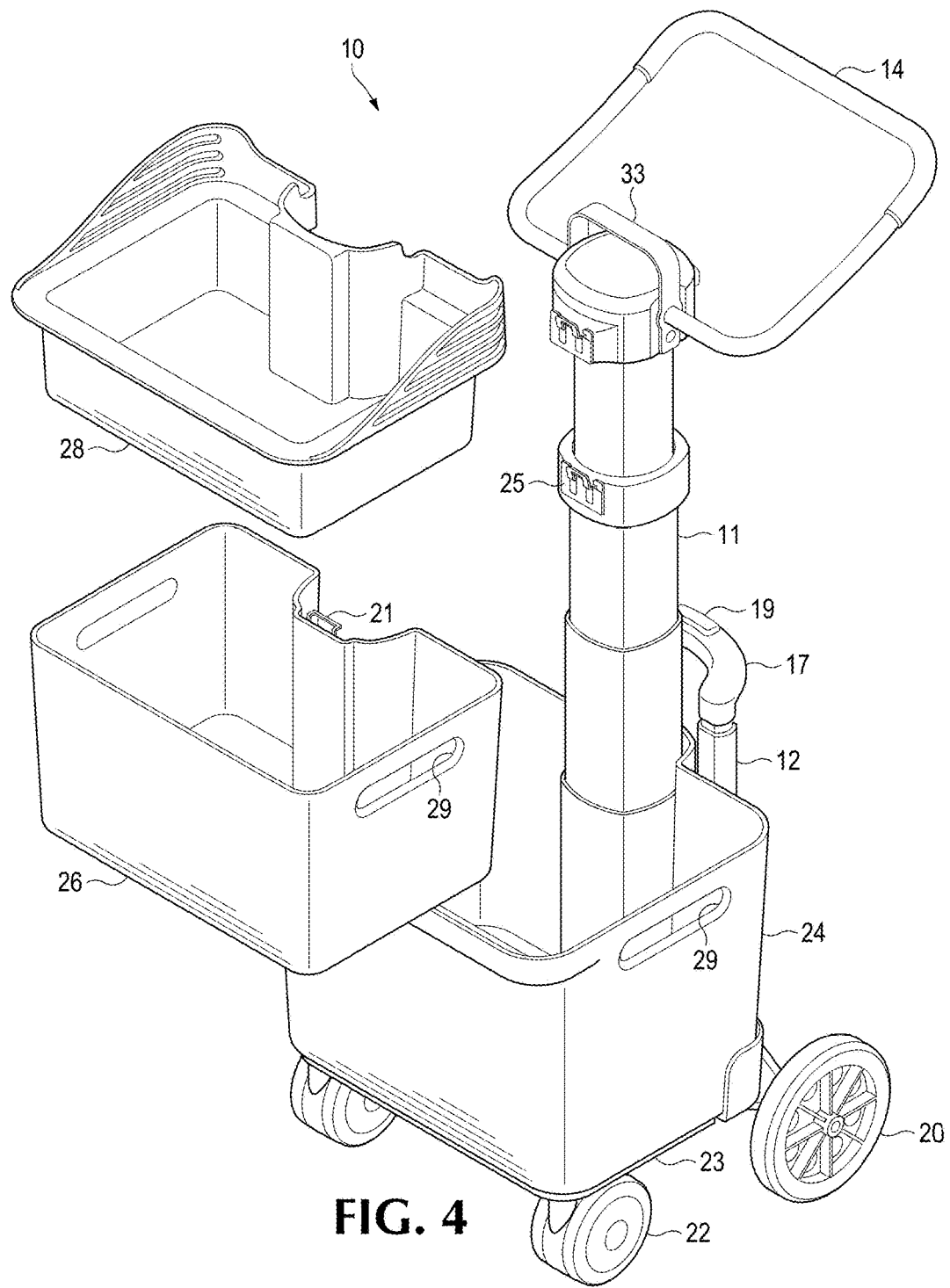
FIG. 4 is a perspective view of a market trolley in accordance with the disclosure illustrating removal of the upper bins.

Mountable to the frame 11 is a set of nesting bins 24, 26, 28, three such bins shown in the illustrated embodiment. The bins are mounted to the frame 11 to enable upward and downward movement in the vertical axis 30 with extension or retraction of the segments of the frame or in a partially vertical axis) while remaining supported by the frame and the bins are of decreasing dimensions starting with the largest bin 24 on the bottom, the middle bin 26 being smaller and the top bin 28 being the smallest, such that the bins can nest as shown in FIG. 2 and FIG. 3 when lowered with the frame. The bins can in a particular embodiment suitably nest such that the upper peripheral edges of the bins are flush when nested, or the upper peripheral edges of inner bins are above or below the upper peripheral edge of one or more relatively outer bins. Bins 26 and 28 are removably mounted to the frame, enabling their removal as illustrated in FIG. 4, to provide a reduced capacity trolley if the user so desires or for transporting the bins to a location for ease of filling or emptying the bins. Bin 24 may be either removable or designed to be fixed to the frame. Extension or retraction of the frame 11 is controlled by depressing actuator button 31, located at the upper portion of the frame 11. In the illustrated embodiment, the bin 26 has upper side openings positioned on each lateral side to operate as handles for lifting the bin when it is removed from the trolley and bin 24 has openings 29 as handles for lifting the trolley, especially when in the nested configuration. Alternatively, rather than through cut handles as illustrated, an indentation adapted for use as handles might be employed instead.

The handle 12 consists of nesting telescoping portions 12', 12" and 12''', with a central grip portion 17 having an actuator button 19. Depressing the actuator button 19 releases a mechanism holding the handle portions in position, enabling the handle to be collapsed as shown in FIG. 3, or extended as in FIG. 2. Collapsing the handle 12 and bins 26 and 28 into bin 24 reduces the overall space occupied by the trolley for storing or transport.

The pivoting handle extension. 14 can be pivoted about axis 15 to move rearwardly as in FIG. 1, controlled by depressing actuator button 27 located at the top of the upper portion of the frame. When button 27 is depressed, handle 14 is allowed to rotate. When released, the handle 14 is locked against rotation in the position which it was moved to while the button was depressed. Moving handle 14 rearwardly enables a user to push or pull the trolley along much in the manner of pushing/pulling a shopping cart. When not using the handle 14, it can be pivoted forwardly as in FIGS. 3, 6, 8 and 9, to position it in a more convenient configuration so as to not be potentially in the way. Handle 12 and handle 14 can both be used to pull or push the trolley, and they work independently. In typical use, one would most likely use the handle 12 to pull the trolley in the nested configuration, and use the handle extension 14 to push the trolley in the unnested configuration. Handle extension 14 is suitably designed to be much more robust for heavy loads.

In the illustrated embodiment, the 2 bins 26 and 28 are removably attachable to frame 11 by operation of an engagement hook 21 (illustrated on bin 26 in FIG. 4) which is detachably received by receiver 25 mounted to frame 11, as visible in FIG. 4, a perspective view of the market trolley with bins in the removed configuration. Corresponding hook/receiver members are provided for bins 28 (and 24 in configurations that allow removal of that bin), enabling removal and re-attachment of the bins as desired.

In use, the bins may be adjusted to 3 basic configurations:
1) Nested configuration—the bins nest into each other minimizing the overall dimension of the trolley, as illustrated in FIGS. 2 and 3.

2) Carting configuration—the bins "unnest" as they separate vertically and appear to be stacked with some spacing (bin. 28 above bin 26, bin 26 above bin 24
3) Shopping configuration—one or more bins separate and expand horizontally (and in an alternative embodiment, also extend further vertically) allowing space between the bins enabling the shopper to easily place items into the bins.

The handle 12 extends and retracts separately to allow the trolley to be used in any of the configurations.

Figure 10:
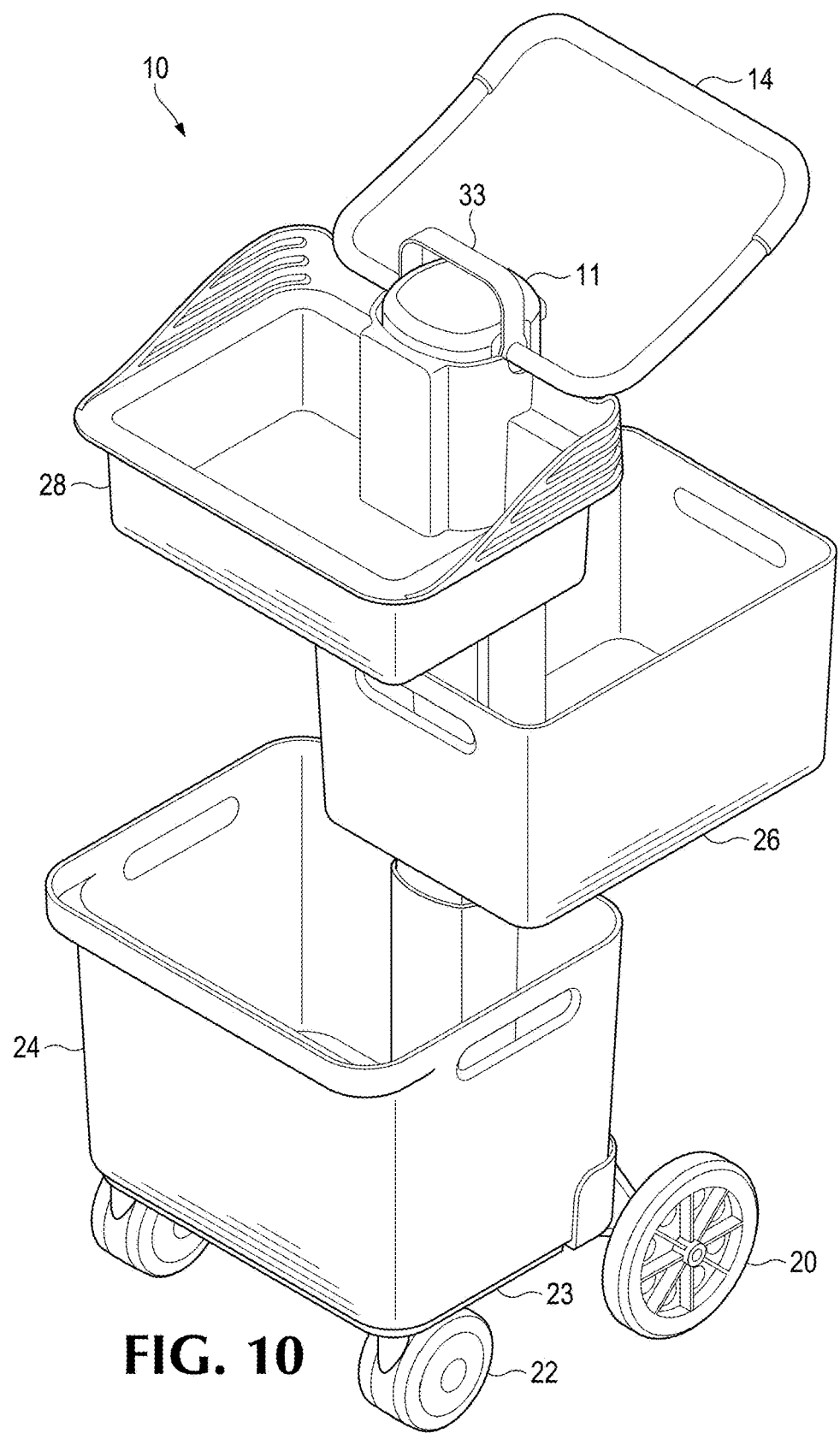
FIG. 10 is a perspective view of a market trolley illustrating the rotation of one of the bins for ease of access to the bin interior.
Figure 11:
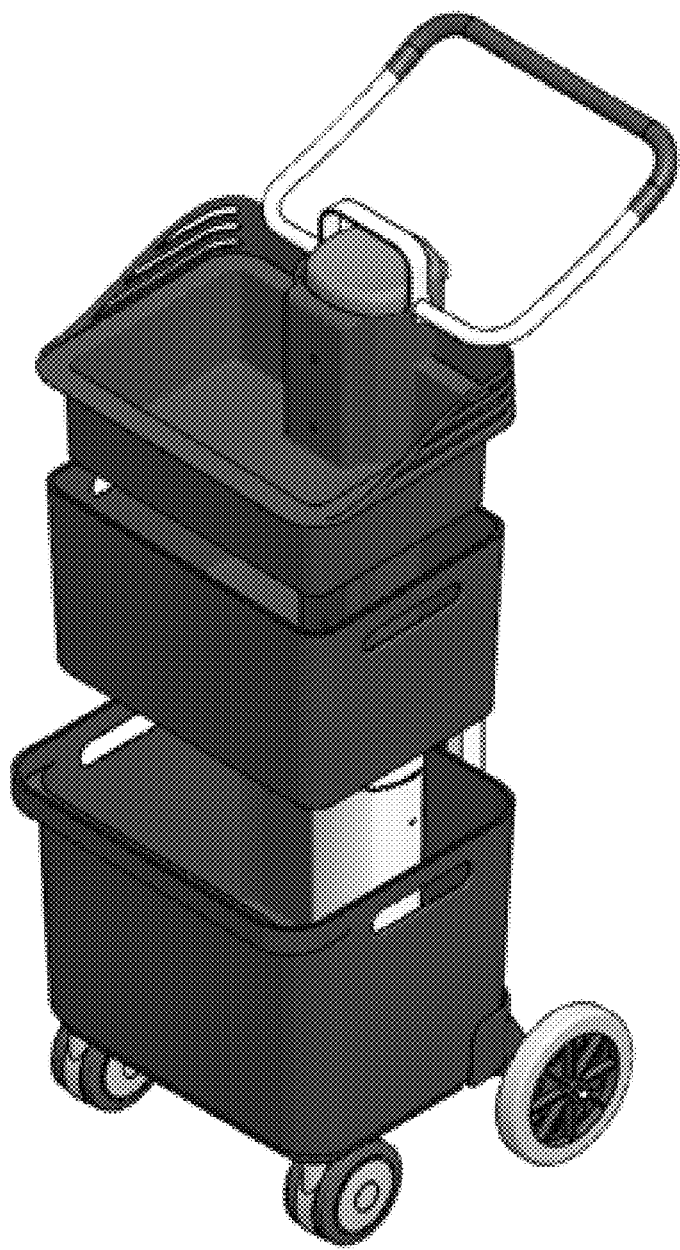
FIG. 11 is a perspective view of a design of a market trolley.
Figure 12:
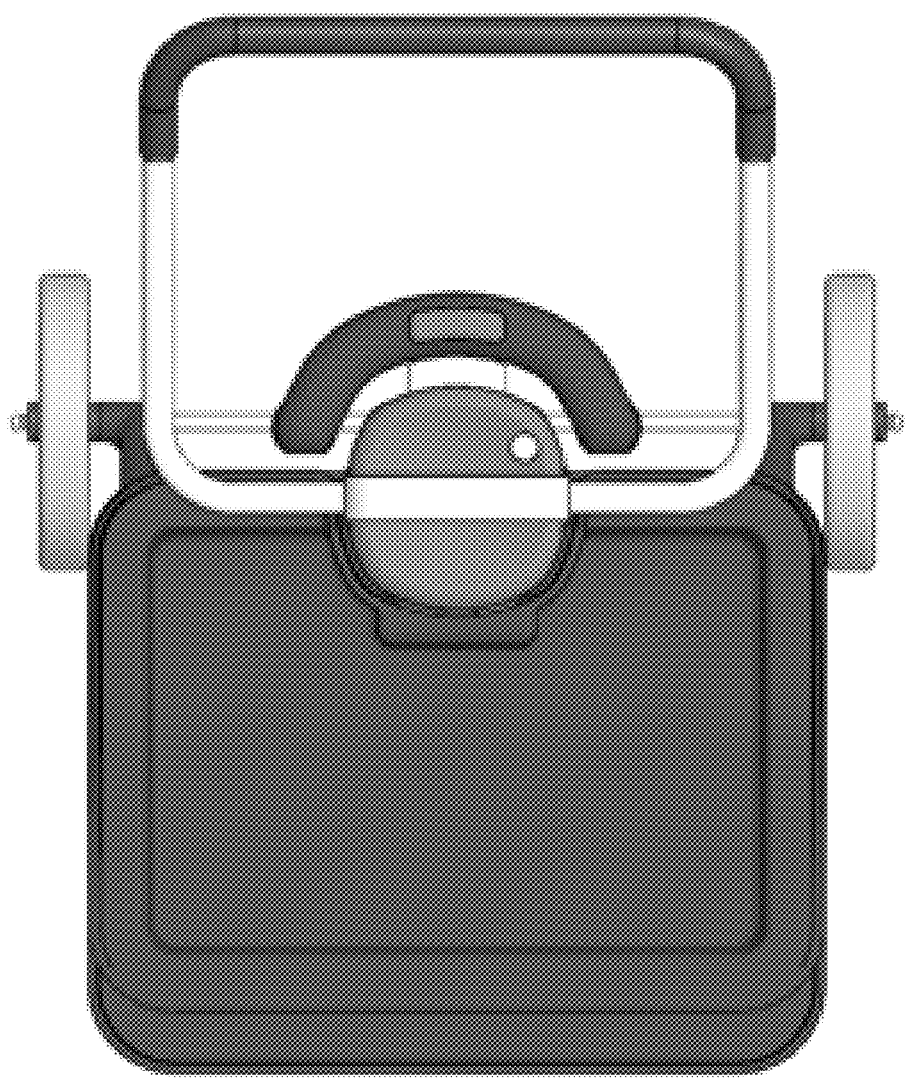
FIG. 12 is a top view of the market trolley of FIG. 11.
Figure 13:
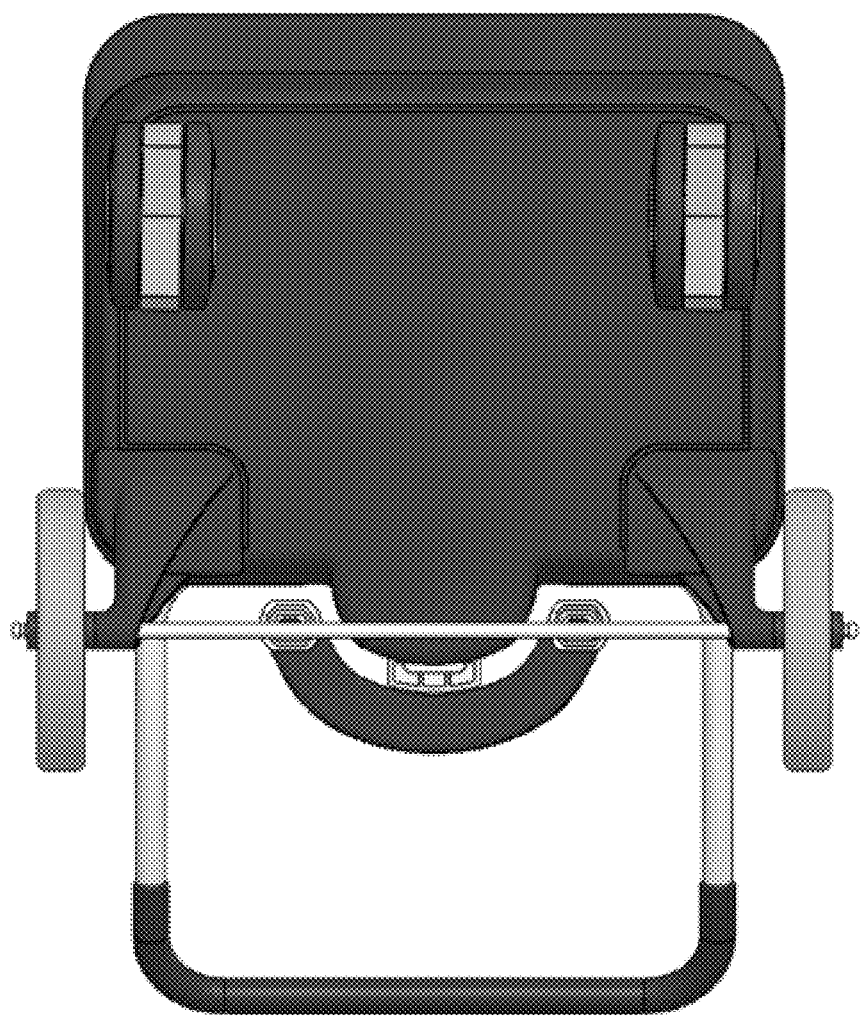
FIG. 13 is a bottom view of the market trolley of FIG. 11.
Figure 14:
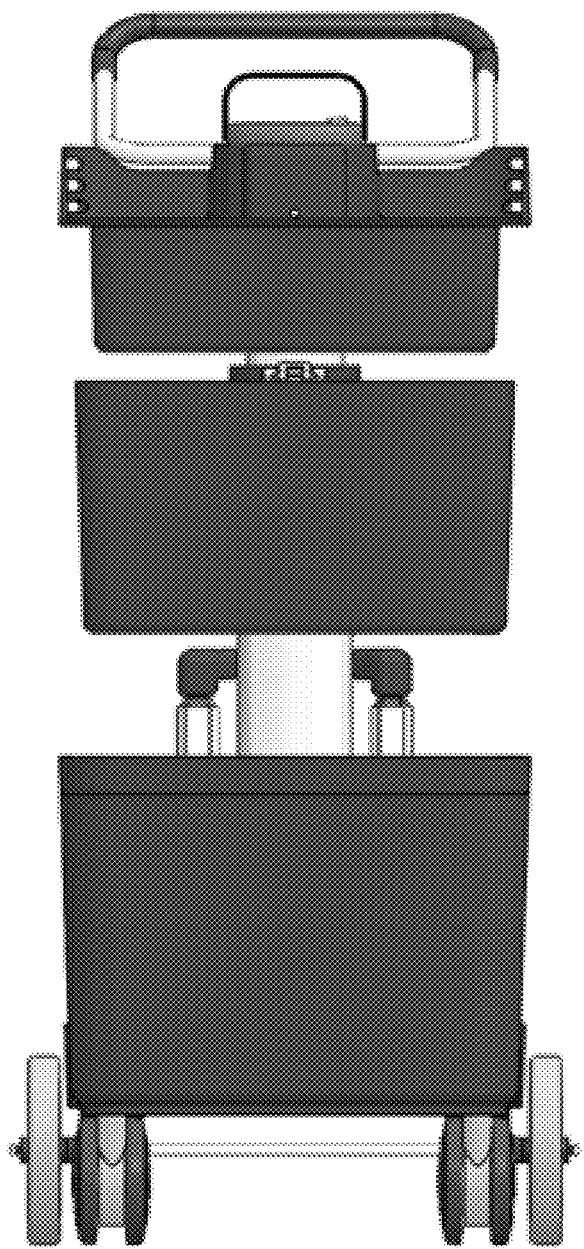
FIG. 14 is a front view of the market trolley of FIG. 11.
Figure 15:
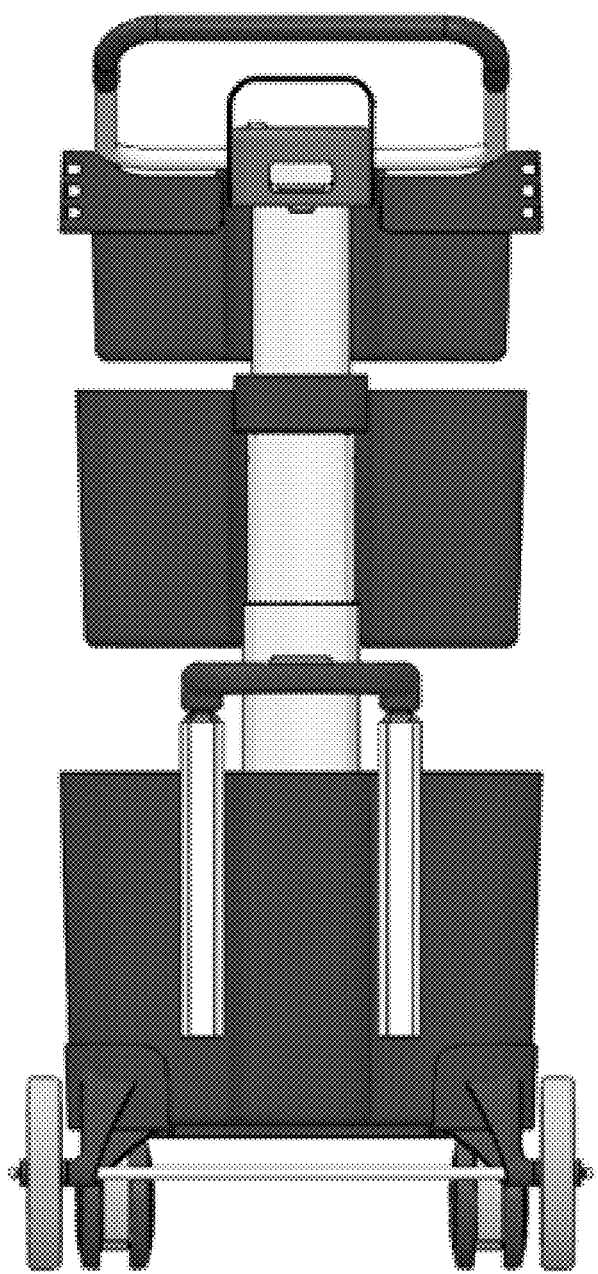
FIG. 15 is a rear view of the market trolley of FIG. 11.
Figure 16:
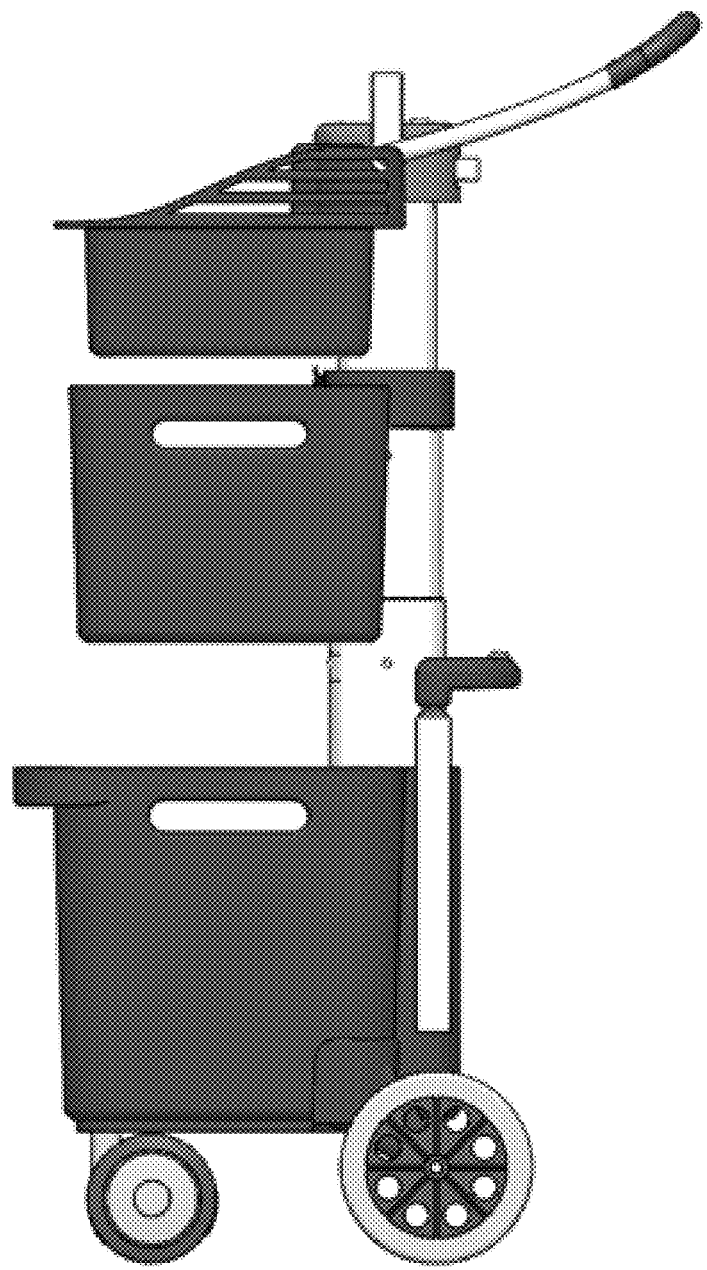
FIG. 16 is a left side view of the market trolley of FIG. 11, the right side view being a mirror image thereof.
Figure 17:
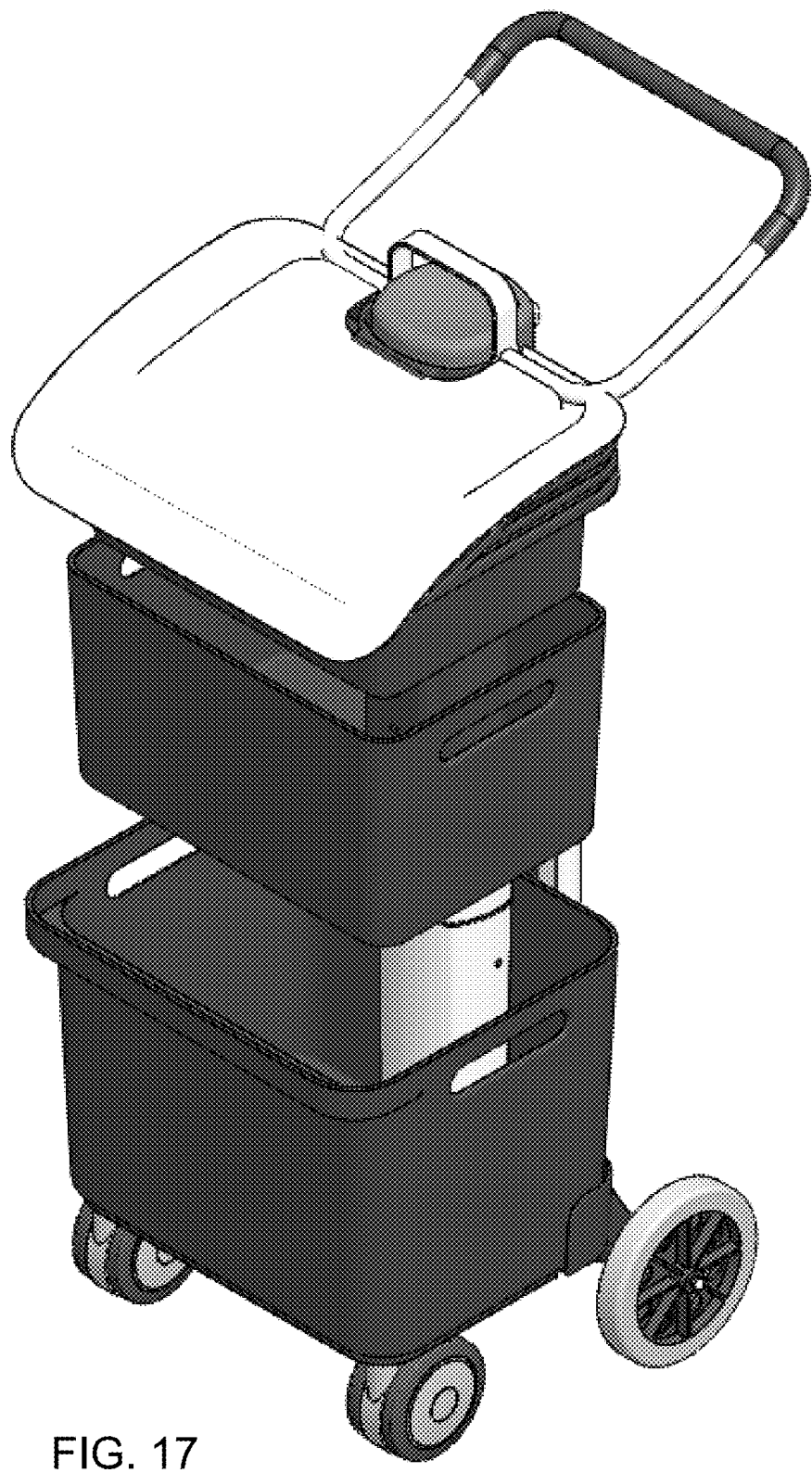
FIG. 17 is a perspective view of a design of a market trolley with a top lid.
Figure 18:
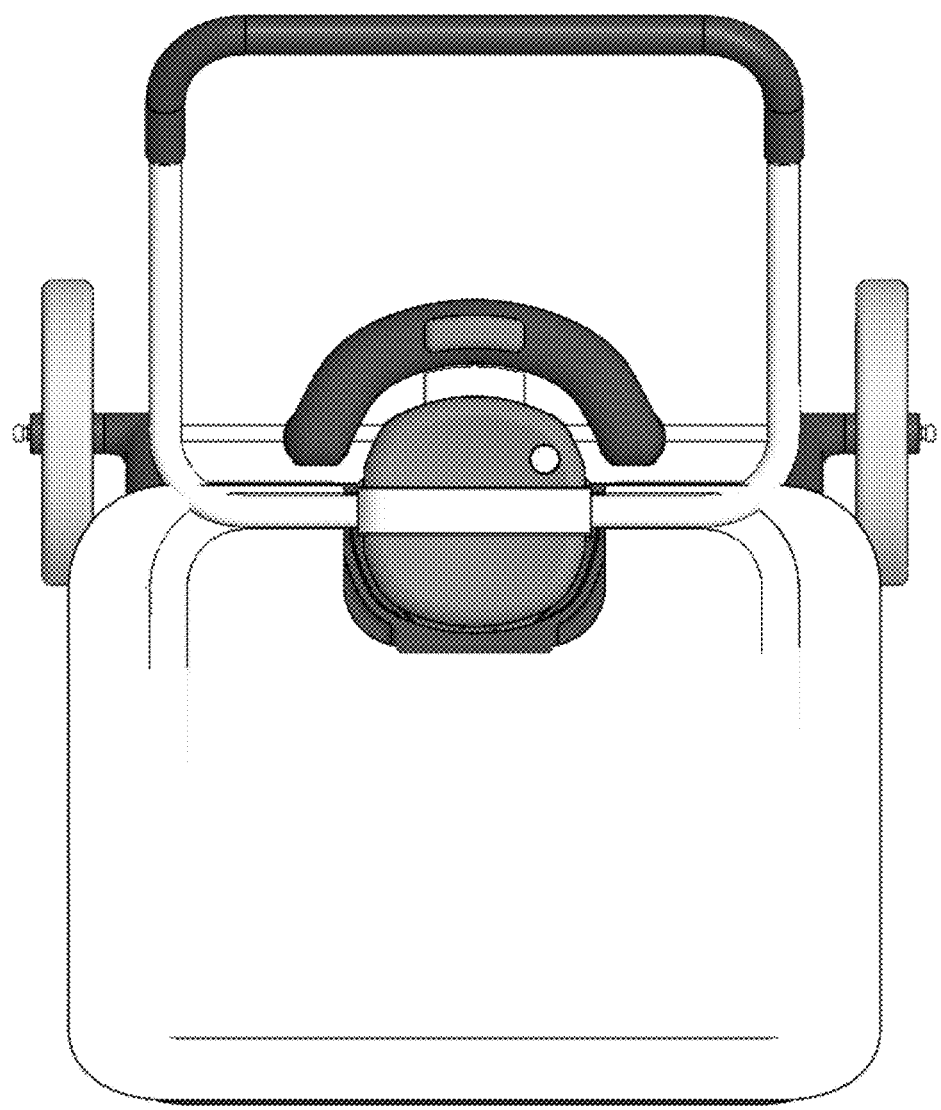
FIG. 18 is a top view of the market trolley of FIG. 17.
Figure 19:
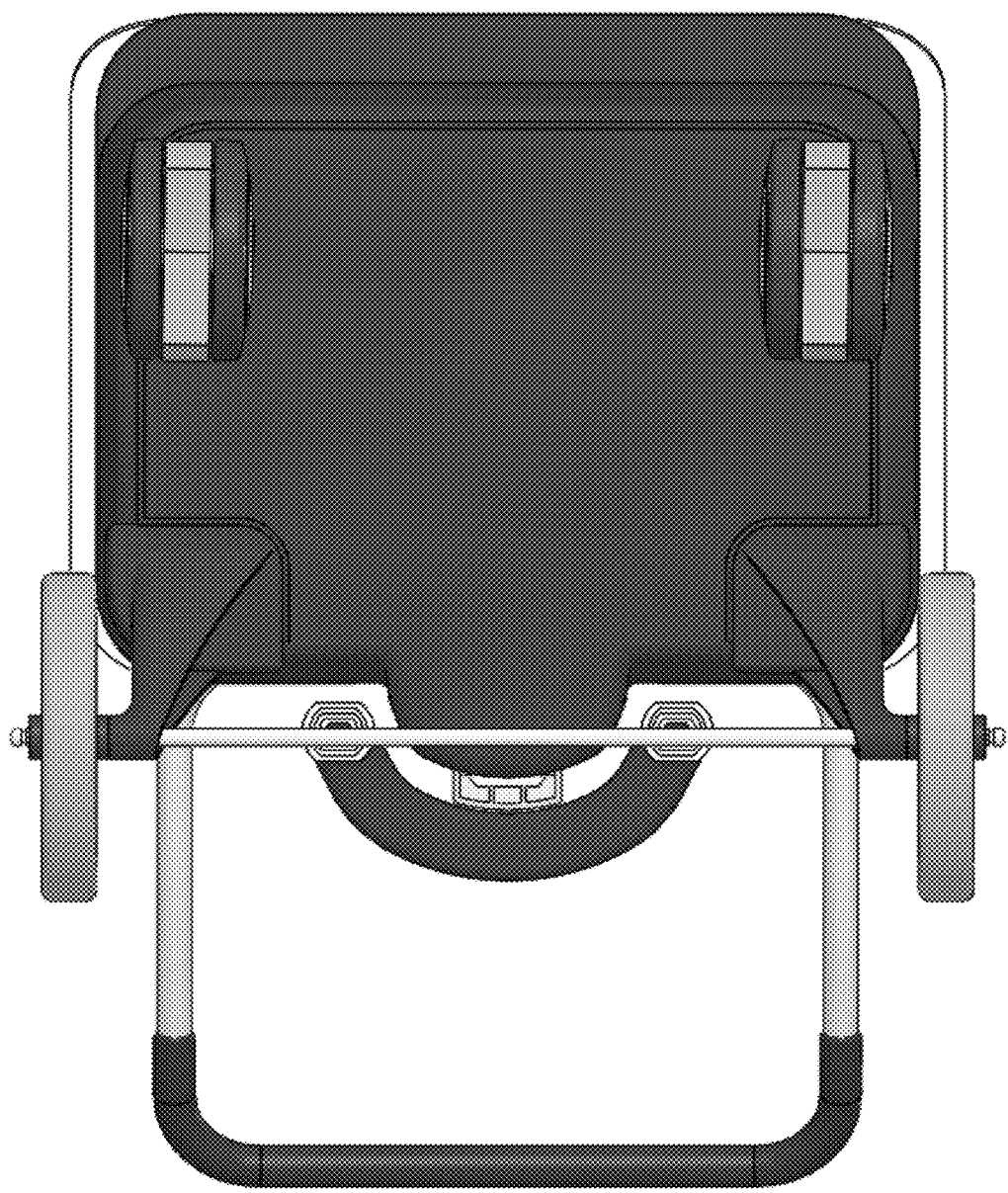
FIG. 19 is a bottom view of the market trolley of FIG. 17.
Figure 20:
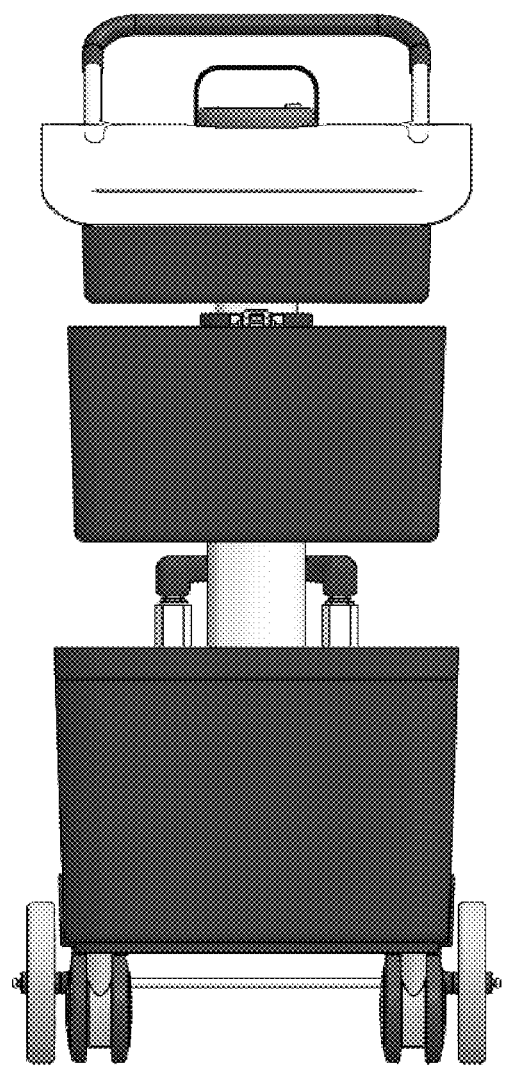
FIG. 20 is a front view of the market trolley of FIG. 17.
Figure 21:
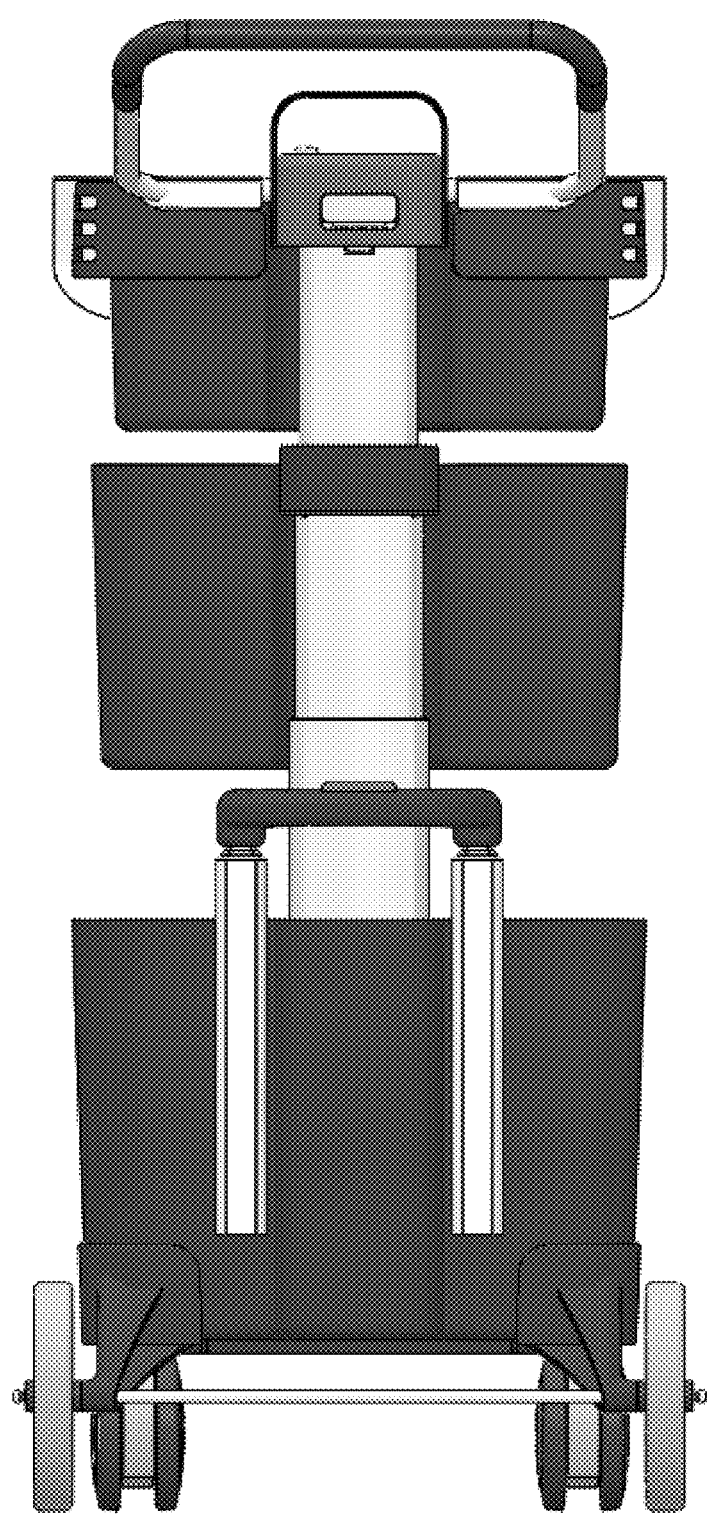
FIG. 21 is a rear view of the market trolley of FIG. 17.
Figure 22:
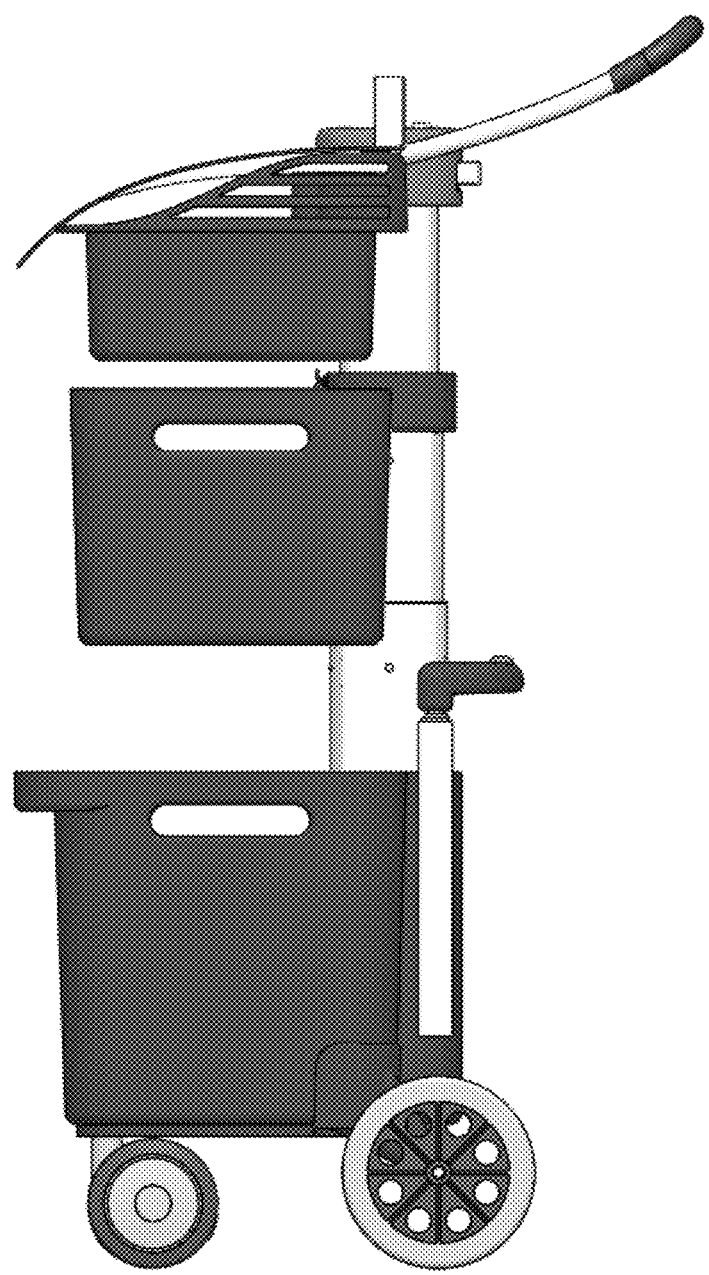
FIG. 22 is a left side view of the market trolley of FIG. 17, the right side view being a mirror image thereof.

Bins 28 and 26 move upwardly and downwardly along vertical axis 30 by extension/retraction of segments of the extensible support 11 enabling the bins to nest and "unnest." In an alternative embodiment, additional vertical separation gives distances 32 and 34 between bin 24 and bin 26 and between bin 26 and bin 28, to enable a user to access the interiors of the lower bins without removing the upper bins. To accomplish this extension or retraction, the user depresses actuator 31 positioned at the top of the vertical support 11, grasps handle portion 33 positioned at the top of the vertical support 11 and moves upwardly or downwardly, to extend or retract the vertical post. Bin 26 (and/or 28) rotates in a horizontal plane about the vertical axis so as to swing outwardly from the vertical alignment with the other bins, as illustrated in FIG. 10. This rotation feature allows access to the interior of bin 26 and bin 24 without having to remove bin 26 or bin 28 or move bin 26 or bin. 28 upwardly.

In an alternative embodiment, bin 26 (or bin 28) is slidably mounted to the frame to allow it to extend outwardly away from the frame along the horizontal axis 36, an extended position thereby exposing the bin's interior space to allow access.

In the preferred embodiment, the bins are substantially rigid and rectangular in overall shape, but alternative embodiments employ semi-rigid or semi-collapsible bins and employ other shapes.

Figure 5:
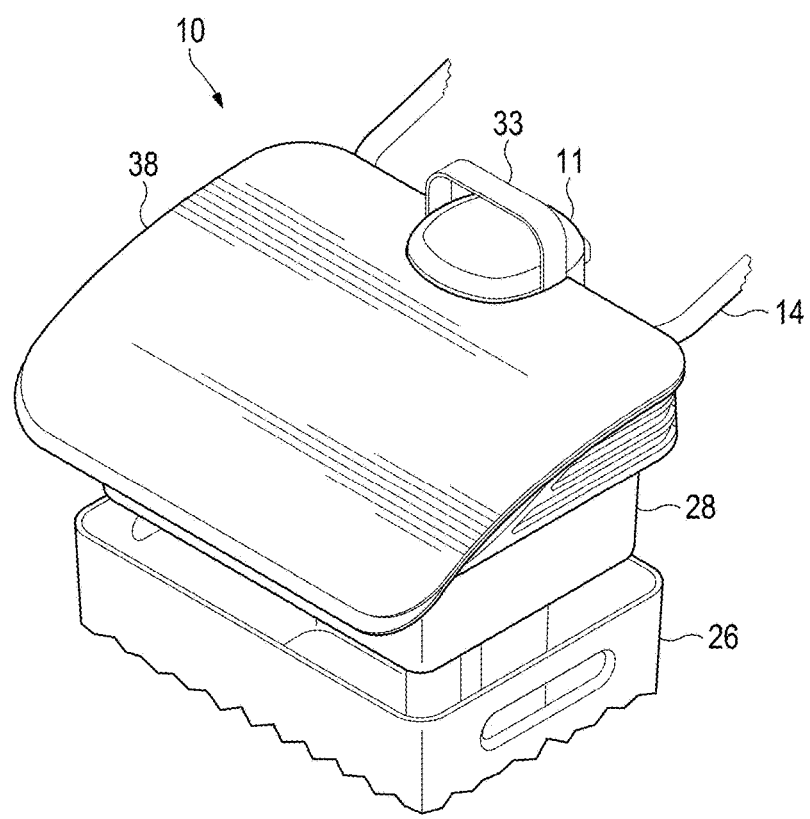
FIG. 5 is a partial perspective view of the market trolley of FIG. 1 with a top lid member installed thereon.
Figure 6:
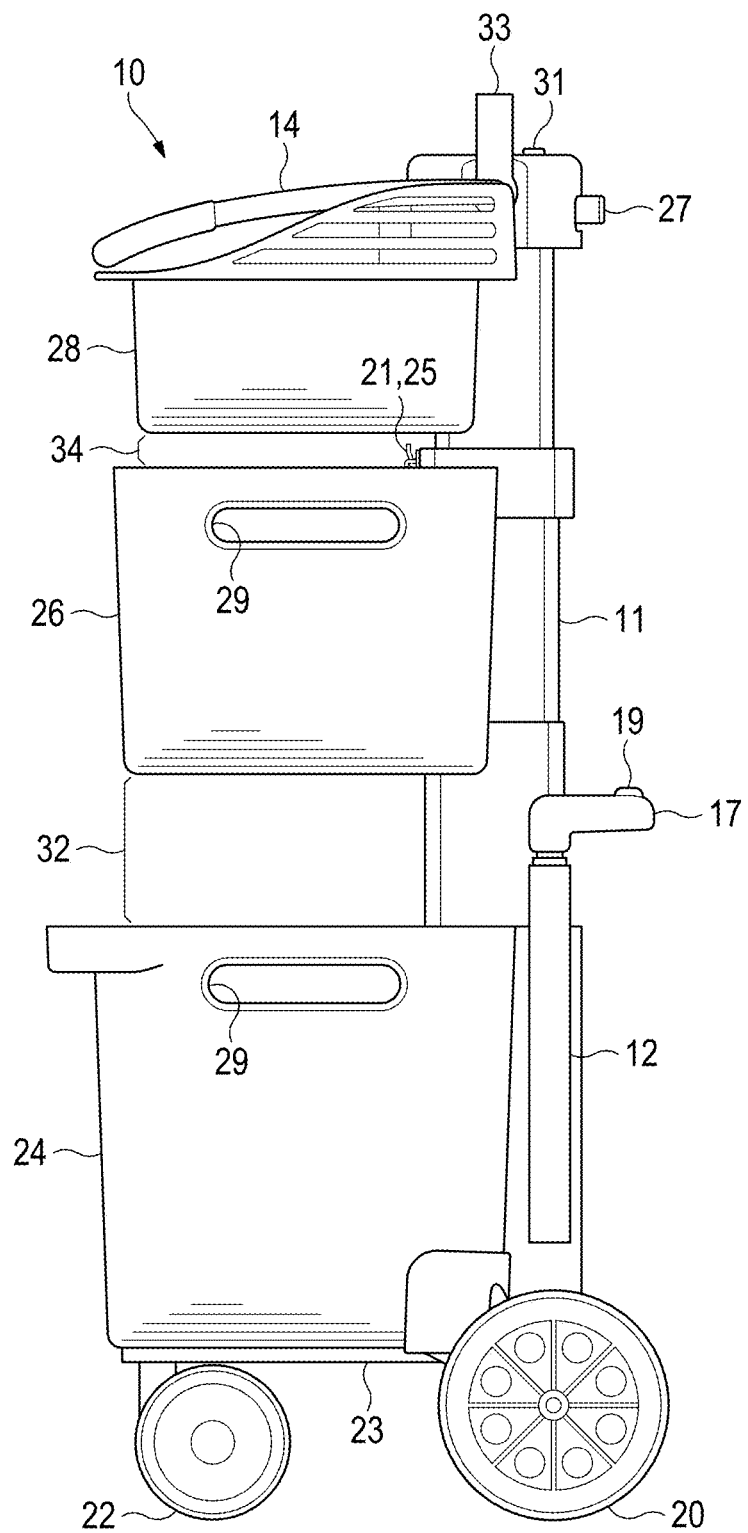
FIG. 6 is a side view of a market trolley.
Figure 7:
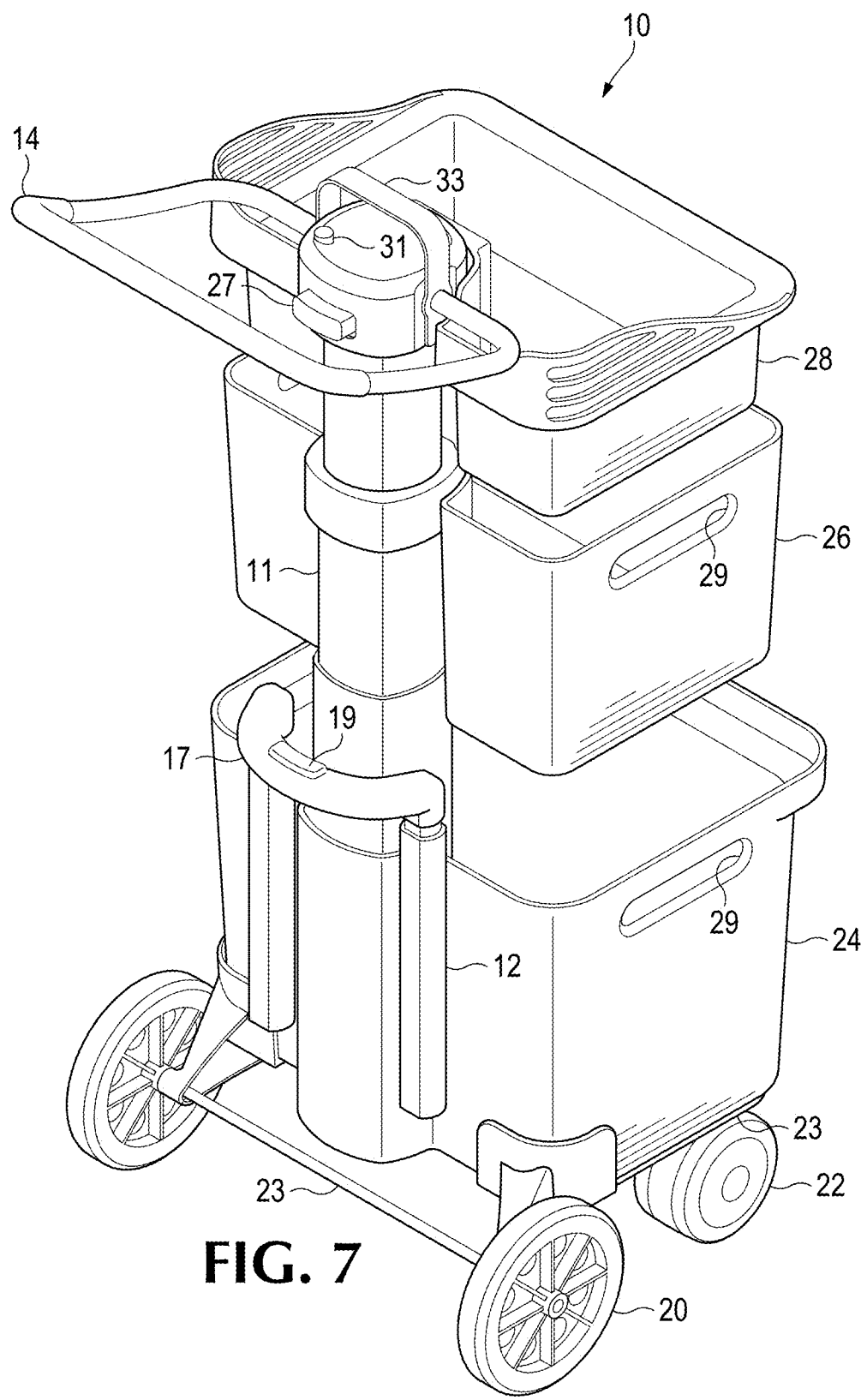
FIG. 7 is a rear perspective view of a market trolley in accordance with the disclosure.

Referring now to FIG. 5, a view of the market trolley of FIG. 1 with a top lid member installed thereon, a top lid member 38 may be provided to shield the bins to protect the content of the bins from weather and to provide privacy as to the contents of the top bin. The lid comprises a rigid or semi-rigid material. The lid pivots about and is attached to the handle extension 14 (alternatively it can be attached to bin 28) to allow access to the topmost bin. The lid is removable if desired or to accommodate a different color or material for style preference.

Referring to FIG. 8, a side view of a market trolley, an optional cover 40 may be provided that covers the outer periphery of bin 24 when the cover is in a lowered position. The upper edge of the cover comprises an elastic portion or means of attachment. 42 to flog the periphery of the bin. To deploy the cover, it may be detached if fasteners are used and pulled upwardly, as shown in FIG. 9, to move the upper portion 42 to hug or attach to the upper most bin 28, providing a cover to the bins. When used in conjunction with top lid 38, the side cover 40 provides protection against the elements and privacy as to the contents of the bins. Fastener elements 44, 44' may be provided on the bins, such as on the upper and lower bins, with corresponding elements on the cover, to assist in holding the cover in place. These fasteners might comprise hook and loop fasteners or mechanical hooks with corresponding receiver elements. If desired, handle 12 can be extend up and extend out from under the fabric cover for transporting with the trolley fully covered.

The illustrated embodiment provides 3 nesting bins, but in alternative embodiments, 1, 2 or more bins may be provided. When more than 3 bins are provided, the middle bins will typically be movable along the horizontal axis to allow access to the contents without interference from the bin immediately above.

While plural embodiments of the market trolley have been shown and described, it will be apparent to those skilled in the art that many changes and modifications may be made without departing from the broader aspects. The appended claims are therefore intended to cover all such changes and modifications as fall within the true spirit and scope of the disclosure.

What is claimed is:

1. A trolley, comprising:
   a base bin adapted for receiving articles therein;
   an extensible structural support frame mounted to said base bin and telescopically collapsible into a portion of the base bin, said extensible structural support frame supporting the vertical position of at least one additional bin in a spaced position away from said base bin when said extensible structural support frame is in a non-collapsed state;
   a first handle attached to said frame for pushing or pulling the trolley; and
   a second handle member separate from said frame operative for allowing a user to push or pull the trolley when said extensible structural support frame is in the non-collapsed state or a collapsed state, said second handle member adapted to collapse to a retracted position,
   further comprising wherein the at least one additional bin is movably mounted to said extensible frame for lowering into and out of said base bin along a vertical axis in a nesting fashion.

2. The trolley according to claim 1, wherein said at least one additional bin nests within said base bin so that a top edge of said additional bin is within close proximity with or lower than a top edge of said base bin when in a nested position.

3. The trolley according to claim 1, wherein said frame vertically slidably mounts said at least one additional bin for controlled lowering of said at least one additional bin into and out of said base bin by extension/retraction of said extensible frame.

4. The trolley according to claim 3, wherein said frame further rotationally mounts said at least one additional bin for rotation in a horizontal plane relative to said frame while maintaining a vertical position of said at least one additional bin, to allow access to said at least one additional bin from above without being impeded by a bin above said at least one additional bin.

5. The trolley according to claim 1, wherein said frame mounts said at least one additional bin in a removable fashion, enabling said bin to be disengaged from said frame for removal.

6. The trolley according to claim 1, further comprising a cover member for selectively covering only the sides of said base bin.

7. The trolley according to claim 1, further comprising a cover member that comprises extensible side members for selectively covering sides of at least one additional bin in addition to said base bin.

8. A market trolley, comprising:
   a base bin for receiving articles therein;
   a frame cooperating with said base bin and collapsible into a portion of said base bin;
   plural additional bins mounted to and supported by said frame in a cantilever fashion positioned in a vertical axis relative to said base bin, wherein said plural additional bins nest into said base bin and into one another when said frame is in a collapsed position and are maintained in spaced vertical positions relative to one another by said frame when said frame is in an uncollapsed state;
a first handle attached to said frame for pushing or pulling the market trolley; and
a second handle member separate from said frame operative for allowing a user to push or pull the market trolley when said frame is in the uncollapsed state or a collapsed state, said second handle member adapted to collapse to a retracted position.

9. The market trolley according to claim 8, wherein when said plural additional bins are nested into said base bin, upper peripheral edges of said plural additional bins are within close proximity with or positioned below an upper peripheral edge of said base bin.

10. The market trolley according to claim 8, wherein at least one of said additional bins is mounted to said frame in a removable fashion, enabling said at least one bin to be disengaged from said frame for removal.

11. The market trolley according to claim 8, further comprising wheels for enabling rolling of said trolley.

12. The market trolley according to claim 8, further comprising a cover member for covering the sides of said base bin and selectively the sides of one or more of said plural additional bins.

13. The market trolley according to claim 12, wherein said cover comprises extensible side members for selectively covering or not covering the sides of said base bin and the sides of said at least one of said plural additional bins.

14. The market trolley according to claim 8 further comprising a rigid or semi-rigid top cover member.

15. The trolley according to claim 1 further comprising a rigid or semi-rigid top cover member.

16. The market trolley according to claim 8, wherein said frame further rotationally mounts at least one of said plural additional bin for rotation in a horizontal plane relative to said frame to allow access to the at least one bin from above without being impeded by a bin above said at least one additional bin.

17. The trolley according to claim 1 wherein the first handle is adapted for pushing or pulling the trolley in the manner of a shopping cart, and, wherein the second handle is adapted for pushing or pulling the trolley in the manner of a suitcase.

18. A market trolley, comprising:
a base bin for receiving articles therein, said base bin further comprising wheels mounted thereto enabling rolling movement of said market trolley;
a frame cooperating with said base bin and collapsible into a portion of said base bin;
plural additional bins mounted to and supported in a position in a vertical axis relative to said base bin by said frame, wherein said plural additional bins nest into said base bin and into one another when said frame is in a collapsed position, at least one of said additional bins is mounted to said frame in a removable fashion, enabling said at least one bin to be disengaged from said frame for removal, said frame further rotationally mounts said at least one of said plural additional bins for rotation of said at least one additional bin in a horizontal plane relative to said frame while maintaining a vertical position of said at least one additional bin, to allow access to said at least one additional bin from above without being impeded by a bin above said at least one additional bin;
a pivoting handle attached to said frame for pushing or pulling the trolley in the manner of a shopping cart; and
a handle member separate from said frame operative for allowing a user to push or pull the market trolley, said handle member adapted to collapse to a retracted position.

19. The trolley according to claim 1, wherein said first handle is pivotable.

20. The market trolley according to claim 8, wherein said first handle is pivotable.

21. The market trolley according to claim 18, further comprising a pivotable top lid member for providing a shield to cover the bins to protect content of the bins from weather and to provide privacy as to the contents of a top bin.

22. The market trolley according to claim 18, further comprising a cover member for selectively covering the sides of only said base bin.

23. The market trolley according to claim 22 wherein said cover member comprises extensible side members for selectively covering the sides at least one of said plural additional bin in addition to said base bin.

* * * * *